(12) United States Patent
Robert et al.

(10) Patent No.: US 10,270,167 B2
(45) Date of Patent: Apr. 23, 2019

(54) ANTENNA APPARATUSES AND APPROACHES THEREFOR

(71) Applicant: NXP B.V., Eindhoven (NL)

(72) Inventors: Harald Robert, Graz (AT); Dariusz Mastela, Gratkorn (AT); Francesco Antonetti, Graz (AT)

(73) Assignee: NXP B.V., Eindhoven (NL)

( * ) Notice: Subject to any disclaimer, the term of this patent is extended or adjusted under 35 U.S.C. 154(b) by 154 days.

(21) Appl. No.: 15/053,944

(22) Filed: Feb. 25, 2016

(65) Prior Publication Data

US 2017/0250469 A1    Aug. 31, 2017

(51) Int. Cl.
| | | |
|---|---|---|
| *H01Q 5/30* | (2015.01) | |
| *H01F 38/14* | (2006.01) | |
| *H02J 50/20* | (2016.01) | |
| *H02J 50/27* | (2016.01) | |
| *H02J 50/80* | (2016.01) | |
| *H04B 5/00* | (2006.01) | |
| *H02J 50/12* | (2016.01) | |
| *H01Q 7/00* | (2006.01) | |

(52) U.S. Cl.
CPC .............. *H01Q 5/30* (2015.01); *H01F 38/14* (2013.01); *H01Q 7/00* (2013.01); *H02J 50/12* (2016.02); *H02J 50/20* (2016.02); *H02J 50/27* (2016.02); *H02J 50/80* (2016.02); *H04B 5/0031* (2013.01); *H04B 5/0037* (2013.01); *H04B 5/0056* (2013.01); *H04B 5/0081* (2013.01); *H01F 2038/143* (2013.01)

(58) Field of Classification Search
CPC ..... H01F 38/14; H01F 2038/143; H01Q 5/30; H01Q 7/00; H02J 5/005; H02J 7/025; H02J 50/10; H02J 50/12; H02J 50/20; H02J 50/27; H02J 50/80; H04B 5/0031; H04B 5/0037; H04B 5/0075; H04B 5/0081; H04B 5/0087
USPC ........................................................ 307/104
See application file for complete search history.

(56) References Cited

U.S. PATENT DOCUMENTS

| | | | |
|---|---|---|---|
| 5,455,466 A | 10/1995 | Parks et al. | |
| 9,613,747 B2 * | 4/2017 | Monat ..................... | H01F 38/14 |
| 9,685,994 B2 * | 6/2017 | Kim ....................... | H04B 5/0037 |
| 9,793,616 B2 * | 10/2017 | Ouyang ................. | H01Q 21/30 |
| 2010/0222010 A1 | 9/2010 | Ozaki et al. | |
| 2013/0017781 A1 | 1/2013 | Jones | |
| 2013/0057079 A1 * | 3/2013 | Park ........................ | H02J 7/00 |
| | | | 307/104 |

(Continued)

FOREIGN PATENT DOCUMENTS

| | | |
|---|---|---|
| CN | 103199333 A | 7/2013 |
| WO | WO 2010035256 A2 | 4/2010 |

OTHER PUBLICATIONS

Extended European Search Report for Patent Appln. No. 17153787.1 (dated Jun. 26, 2017).

*Primary Examiner* — Levi Gannon

(57) ABSTRACT

Aspects of the present disclosure are directed to an antenna, various implementations and methods therefor. Various embodiments are amenable to implementation with a receiver circuit that harvests power using energy from a radio frequency (RF) signal received, and a near-field communication (NFC) circuit. A first antenna collects and presents the RF signal to the receiver circuit, and a second antenna communicates NFC signals for the NFC circuit using an antenna portion shared with the first antenna.

20 Claims, 5 Drawing Sheets

(56) References Cited

U.S. PATENT DOCUMENTS

| | | | |
|---|---|---|---|
| 2013/0234658 A1* | 9/2013 | Endo | H02J 7/025 |
| | | | 320/108 |
| 2013/0264997 A1 | 10/2013 | Lee et al. | |
| 2014/0197694 A1 | 7/2014 | Asanuma et al. | |
| 2015/0091502 A1* | 4/2015 | Mukherjee | H02J 7/025 |
| | | | 320/108 |
| 2017/0070104 A1* | 3/2017 | Chung | H02J 50/80 |

* cited by examiner

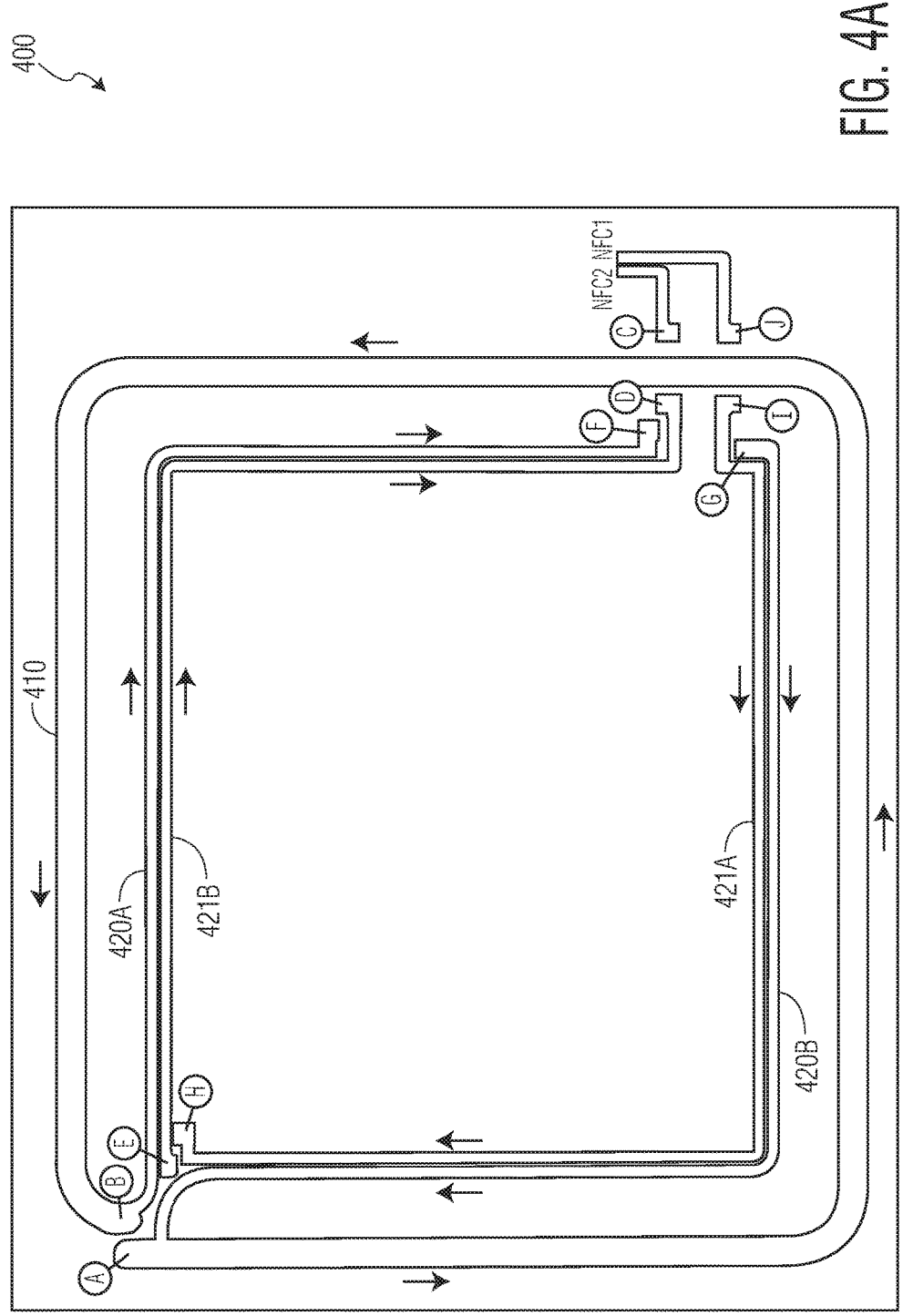

ANTENNA APPARATUSES AND APPROACHES THEREFOR

OVERVIEW

Aspects of the present disclosure relate to apparatuses, devices, and methods for antennas and implementation thereof. Various aspects are directed to antenna circuits providing different receiving characteristics, some of which may be referred to as dual-mode antennas. These receiving characteristics can be used for a variety of applications. One such application involves wireless charging and wireless communications. For instance, in various embodiments wireless charging circuitry is implemented along with near-field communications (NFC) circuits using one or more common antenna windings. Such embodiments may be amenable to implementation with, for example, portable devices such as mobile phones.

Wireless charging embodiments may involve, for example, charging approaches set by the Alliance for Wireless Power (A4WP). Approaches using A4WP may allow for larger, more powerful designs and can be more practical when it comes to charging multiple devices. Various A4WP embodiments operate at 6.78 MHz, which is relatively close to frequencies such as that used in NFC communications, of 13.56 MHz. The respective frequencies of operation can present a challenge for implementing NFC with A4WP with regard to an antenna.

With shared antennas, issues can occur without galvanic separation, in which the resulting frequency of a combined solution may move down below the lower frequency of two systems (e.g., <6.8 MHz). For instance, where matching circuits (e.g., based on capacitors) of both systems are connected in parallel by way of a shared antenna, the matching circuits may provide higher total capacitance that can pull the frequency down. These and other matters have presented challenges to various antenna and radio frequency components, for a variety of applications.

SUMMARY

Various example embodiments are directed to antennas, and to implementing multiple communication approaches therewith.

Various embodiments are thus amenable to implementation with a receiver circuit that harvests power using energy from a radio frequency (RF) signal received, and a NFC circuit. An antenna collects and presents the RF signal to the receiver circuit, and another antenna communicates NFC signals for the NFC circuit using a shared portion of the antenna that collects the RF signal for the receiver circuit. This shared portion operates to RF decouple the receiver circuit from the NFC signals.

Another embodiment is directed to an apparatus including a receiver circuit, a NFC circuit, and first and second antennas. The receiver circuit outputs power using energy from a RF signal received across respective terminals at a first frequency. The NFC circuit communicates (transmits and/or receives) via NFC signals at respective terminals at a second different frequency. The first antenna has windings connected in series with the terminals of the receiver circuit, collects the RF signal at the first frequency, and presents the RF signal to the receiver circuit. The second antenna has windings connected in series with the terminals of the NFC circuit, including a first set of windings connected to a first one of the terminals of the NFC circuit and to one of the windings of the first antenna, a second set of windings connected to a second one of the NFC circuit terminals and to another one of the windings of the first antenna, and the windings of the first antenna to which the first and second sets of windings are connected. In this context, the second antenna includes a series portion of the first antenna, connected to additional windings and to the NFC terminals. The second antenna collects the NFC signals at the second frequency and provides the NFC signals to the NFC circuit.

Another embodiment is directed to an apparatus including first and second antennas that share windings with one another as follows. The first antenna has windings connected in series with a first set of terminals, via which additional circuitry may be coupled (e.g., for communications and/or power transfer), and is configured to collect and present a radio frequency (RF) signal at a first frequency. The second antenna has windings connected in series with a second set of terminals, via which additional circuitry as noted above may also be coupled, and is configured to collect an RF signal at a second frequency that is different than the first frequency. The second antenna includes a first set of windings connected to a first one of the second set of terminals, a second set of windings including a subset of the windings of the first antenna connected to the first set of windings, and a third set of windings connected to the second set of windings and to a second one of the second set of terminals. In this context, the first, second and third sets of windings are connected in series with the second set of terminals and form a circuit path therebetween.

Another embodiment is directed to a method as follows. A first antenna is provided with windings connected in series with a first set of terminals of a first receiver circuit, such that the first antenna is configured to collect a RF signal at a first frequency and to present the collected RF signal via the first set of terminals. A second antenna, having windings connected in series with a second set of terminals of a second receiver circuit, is utilized for collecting an RF signal at a second frequency that is different than the first frequency, and for presenting the RF signal at the second frequency via the second set of terminals. The windings of the second antenna include a first set of windings connected to a first one of the second set of terminals, a second set of windings including a subset of the windings of the first antenna connected to the first set of windings, and a third set of windings connected to the second set of windings and to a second one of the second set of terminals. The first, second and third sets of windings are connected in series with the second set of terminals and form a circuit path therebetween. While collecting the RF signal at the second frequency, the second antenna can be utilized to RF decouple the first receiver circuit from the second antenna. Power may further be generated at the first receiver circuit using the first RF signal, by matching an impedance of the first antenna at the first frequency. The impedance of the first antenna can be implemented in a manner different from the impedance of the second antenna.

The above discussion/summary is not intended to describe each embodiment or every implementation of the present disclosure. The figures and detailed description that follow also exemplify various embodiments.

BRIEF DESCRIPTION OF THE FIGURES

Aspects of the present disclosure may be more completely understood in consideration of the detailed description of various embodiments of the present disclosure that follows in connection with the accompanying drawings, in which:

FIGS. 4A and 4B show top and bottom layers of an antenna circuit, in accordance with one or more embodiments.

Figure 1:
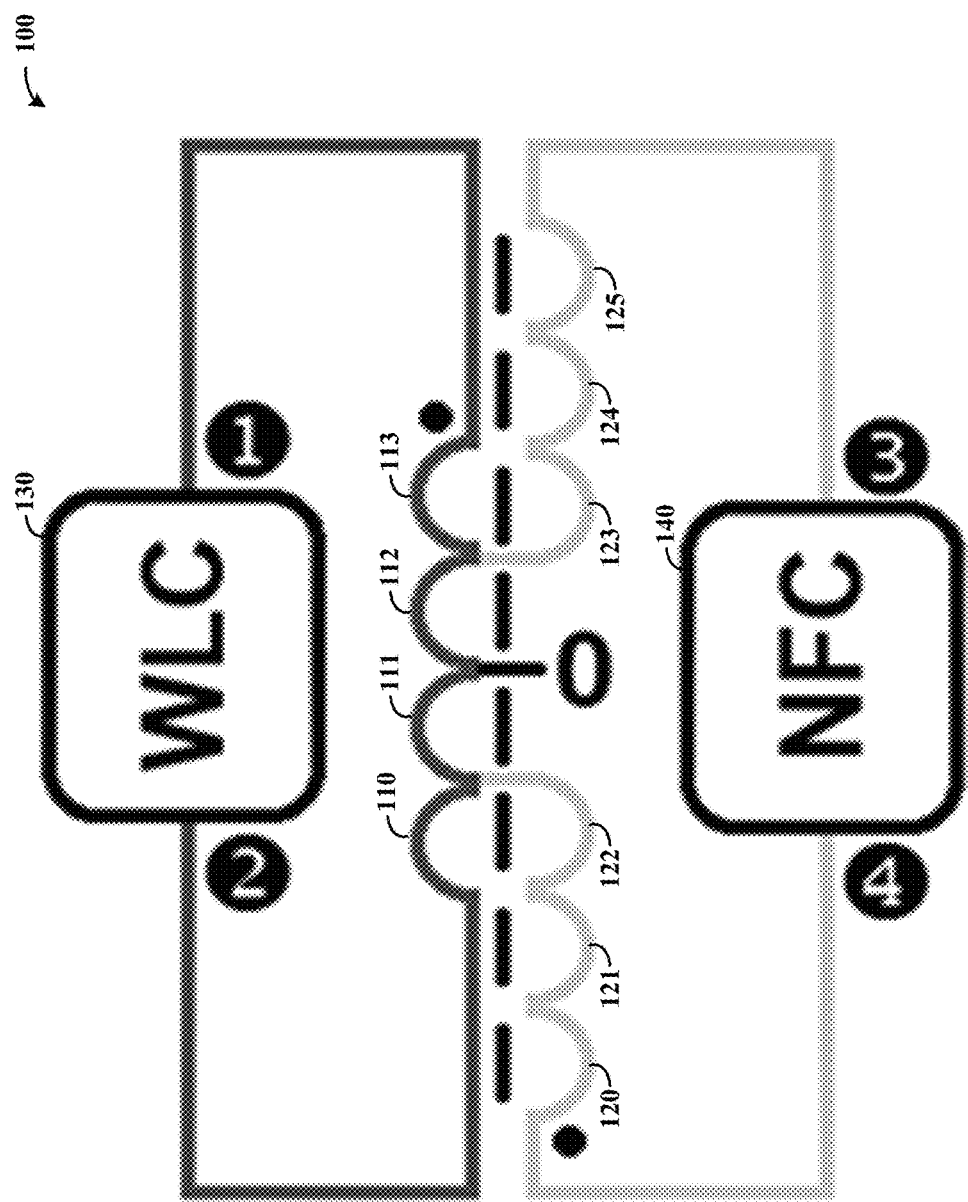
FIG. 1 shows an antenna circuit, with an implementation including wireless charging (WLC) and near-field communications (NFC), in accordance with one or more embodiments.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving antennas. In certain implementations, aspects of the present disclosure have been shown to be beneficial when used in the context of dual-mode antennas, such as those implemented to communicate (send and/or receive) signals at different frequencies and/or for different uses. In some embodiments, these aspects involve circuitry that couples radio frequency (RF) signals to a wireless power/charging circuit, and that communicates NFC signals to an NFC circuit while mitigating the coupling of the NFC signals to the wireless power/charging circuit. Such circuitry may, for example, be implemented in portable devices that utilize wireless charging for storing energy in a battery, and which also utilize NFC (or other RF) communications. These and other aspects can be implemented to address challenges, including those discussed above. While not necessarily so limited, various aspects may be appreciated through a discussion of examples using such exemplary contexts.

As may be implemented with various embodiments (and as may address challenges identified herein), a dual mode antenna supports communications and wireless power circuits, and more specifically NFC and A4WP circuits, with an RF decoupling approach that may be implemented without necessarily using components such as relays or other switches. Each circuit utilizes a shared antenna (e.g., a ferrite foil/layer), in which sections of the antenna remain galvanically connected and in which a portion of the antenna (and/or related circuitry) is RF decoupled. This RF decoupling can be carried out by flowing current within an A4WP antenna section in an opposite direction relative to current that would otherwise flow in the A4WP antenna section.

In this context, RF decoupling can be utilized to ensure that RF power generated by the NFC circuit is not absorbed by the wireless charging circuitry, in which current flowing for the NFC communications through the shared turns of the wireless charging portion of the antenna counters any generation of current to the wireless charging circuitry. For instance, where wireless charging circuitry includes a matching circuit operable to match a first frequency at which wireless charging signals are to be communicated, and where NFC circuitry includes a different matching circuit operable to match a second, different frequency at which NFC signals are communicated, the matching circuit of the wireless charging circuitry can be accordingly decoupled from the NFC signals.

In various implementations, two outer antenna turns (e.g., windings) are used by the wireless power circuit, to provide desirable coupling and higher energy transfer, with a second one of the turns being shared with turns of the NFC antenna section including additional turns. The size of the antenna and the number of turns can be selected to achieve desirable matching for wireless charging and NFC performance.

In various implementations, additional circuitry is implemented to mitigate or prevent direct current (DC) flow between WLC and NFC circuitry. Such implementations may, for example, employ DC-blocking capacitors.

Various embodiments involving an apparatus having wireless power receiver and NFC circuitry are implemented with first and second antennas as follows. The first antenna has windings connected in series with terminals of the receiver, collects an RF signal at a first frequency and presents the RF signal to the receiver. The receiver harvests power from the RF signal across the terminals, utilizing an induced voltage differential (e.g., by rectifying and regulating power from the RF signal). The second antenna has windings connected in series with the terminals of the NFC circuit, via which the NFC circuit communicates (transmits and/or receives) at a second frequency that is different than the first frequency at which the receiver is designed to harvest power.

The antennas share windings, with the first antenna having a series of windings (e.g., two or more full windings, or multiple half windings) connected between the receiver's terminals. The first antenna thus can operate as a transformer winding relative to a wireless power transmitter's winding, for coupling power therefrom. The second antenna utilizes windings shared with the first antenna, as well as additional windings, with all the windings connected in series with the NFC circuit's terminals. In some embodiments, the shared windings are in series with first and second sets of windings of the second antenna that are respectively connected to first and second ones of the NFC circuit's terminals.

The windings are arranged in a variety of manners, to suit particular embodiments. In certain embodiments, one or more of the shared windings are part of the first antenna, with the second antenna being connected to and utilizing the shared windings of the first antenna. In this context, the second antenna includes a series portion of the first antenna, connected to additional windings and to the NFC terminals. In other embodiments, one or more of the shared windings are part of the second antenna with the first antenna being connected to and utilizing the shared windings of the second antenna. In yet other embodiments, one or more of the shared windings are separated from the first and second antennas, with each antenna being connected to the shared windings. Further, in certain implementations the shared windings are offset from the terminals of the wireless power circuit or the NFC circuit, and in other implementations are connected to one of these terminals.

In various embodiments, the windings shared between the antennas facilitate RF decoupling of NFC signals from the wireless charging circuit. This may be effected, for example, by selecting a number of shared windings that is equal to a number of windings in the first antenna that are not shared, and by passing current through these windings that provides a cancellation of the voltage across these windings. RF decoupling, in this context, may involve cancelling a substantial portion or about all of any signal generated in other (unshared) windings of the first antenna. NFC signals may thus be mitigated from reaching, or prevented from reaching, the wireless power receiver. This may be carried out by providing a voltage drop and/or magnetic field across the shared windings that opposes (e.g., is opposite in polarity to) a voltage drop/magnetic field generated across other windings of the first antenna by the NFC signals. RF decoupling may thus also be carried out by flowing current in shared windings of the first antenna to which the first and second sets of windings of the second antennas are connected that mitigates current flow to the receiver circuit (e.g., by flowing current in a direction that is opposite that in which current flows for harvesting power).

In various implementations, the receiver includes a matching circuit that matches an impedance of the first antenna at the first frequency, as presented between the respective receiver terminals. The NFC circuit also includes a matching circuit that matches an impedance of the second antenna at the second frequency, as presented between the respective NFC circuit terminals. In this context the windings may be operable to RF decouple the matching circuits when (in response to) the second antenna receives the NFC signals at the second frequency. The impedance of the second antenna is, in various contexts, the collective impedance provided by the first and second sets of windings coupled to the NFC terminals as well as the shared windings of the first antenna.

Another embodiment is directed to an apparatus including first and second antennas that share windings with one another as follows. The first antenna has windings connected in series with a first set of terminals, via which additional circuitry may be coupled (e.g., for communications and/or power transfer). The second antenna has windings connected in series with a second set of terminals, via which additional circuitry, as noted above, may also be coupled. The antennas are respectively configured to collect RF signals at different frequencies, with the shared windings being operable to RF decouple the first set of terminals from signals communicated via the second antenna. For instance, the second antenna may include first and second sets of windings connected to the second set of terminals and in series with the shared windings therebetween, forming a circuit path between the second set of terminals. The shared windings are configured with other windings to mitigate or prevent coupling of signals between the respective terminals, such as by cancelling any generation of a magnetic field, voltage or current in one of the antennas (e.g., via current flowing in the shared windings).

A variety of types of circuitry may be implemented with the antenna structure above. Such circuitry may include two different types of communications circuits, different wireless power circuits, or combinations of communication and power circuits. In some embodiments, receivers are connected across the first set of terminals, along with (or having) matching circuitry for each receiver that respectively match the (different) impedances of the first and second antennas at the first and second frequencies. One of the receivers may, for example, harvest power from RF signals coupled to the receiver, and the other one of the receivers may communicate via the RF signals (such as via NFC signals as characterized herein). The term RF signals, in this and other contexts herein, may thus include an RF wave that transmits power without necessarily including or otherwise recognizing data.

Various other embodiments are directed toward methods of communicating, cancelling signals, and otherwise sharing antenna windings as noted herein. For instance, the aforementioned antenna circuitry can be implemented to carry out such communicating and cancellation, as may be implemented for power harvesting, data communication and a combination thereof.

Turning now to the figures, FIG. 1 shows an antenna circuit 100, including a shared antenna having windings 110-113, and an antenna having windings 120-125, in accordance with one or more embodiments. The respective antennas may, for example, be referred to as a single antenna. The antenna circuit 100 is shown with an implementation including a wireless charging (WLC) circuit 130 and a near-field communications (NFC) circuit 140. The WLC circuit 130 utilizes windings 110-113 for receiving high frequency RF signals for generating wireless power across respective nodes of the WLC circuit (e.g., at nodes close to points 1 and 2, with point 1 at an operating voltage V+ and point 2 at a reference or ground voltage). The NFC circuit 140 utilizes windings 120-122, 111-112, and 123-125 to provide a circuit path of windings in series across respective nodes of the NFC circuit (e.g., at nodes close to points 3 and 4, as may have about equal behavior to ground, or virtual null, during NFC transmission).

During NFC communications in which current flows in a current path from point 4 to point 3, via windings 120, 121, 122, 111, 112, 123 124 and 125, a magnetic field may be collected by windings 110 and 113 used by the WLC circuit 130. This magnetic field may tend to generate a voltage drop/current across these windings. In this context, the current that passes in the current path from point 4 to point 3 and flowing in windings 111 and 112 counters this voltage drop and cancels any current flow. This effectively RF decouples the WLC circuit 130 from NFC signals communicated with the NFC circuit 140. This (passive) RF decoupling can be implemented without galvanically separating the WLC circuit 130 from the NFC circuit 140, and without utilizing switches. Moreover, the windings can be shared, which can reduce space required for the windings and overall space for the antenna circuit 100. In these contexts, antenna circuit 100 may be considered to include the WLC circuit 130 and/or the NFC circuit 140 as well.

Figure 2:
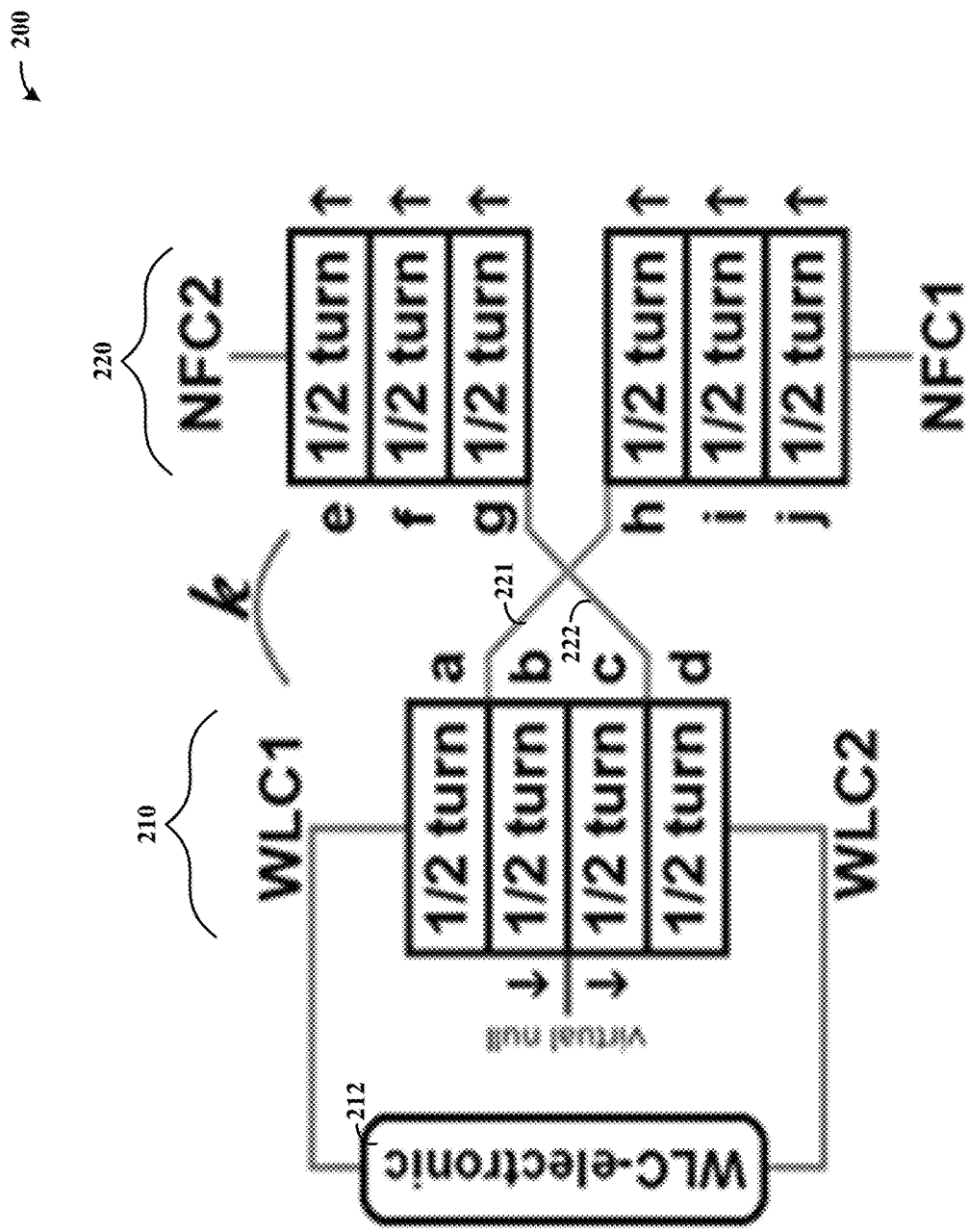
FIG. 2 shows a block diagram of an antenna circuit, in accordance with one or more embodiments.

FIG. 2 shows a block diagram of an antenna circuit 200, in accordance with one or more embodiments. The antenna circuit 200 includes WLC windings 210 and NFC windings 220 for use in wireless charging and NFC. The WLC windings are shown with four half-turns a-d between nodes WLC1 and WLC2 (and shown coupled by way of example to a WLC-electronic circuit 212 for harvesting power). The NFC windings are shown with six half turns e-j between nodes NFC1 and NFC2. The NFC and WLC coils are coupled according to a coupling ratio "k" as shown.

During a WLC mode, the WLC windings a-d collect a wireless signal and in response pass current between WLC1 and WLC2, providing power to WLC-electronic circuit 212. During an NFC mode, current is passed between NFC1 and NFC2, through windings j-i-h-b-c-g-f-e and generating a magnetic field as represented by arrows, with crossover connectors 221 and 222 coupling WLC windings b and c in series with the NFC windings as shown. These WLC windings b and c are thus shared, saving space. Further, a magnetic field induced in windings a and d in the direction shown by the arrows in the NFC windings e-j, is countered by the magnetic field (and any related voltage drop) provided across windings b and c, thus mitigating/preventing current from flowing between WLC1 and WLC2 and therein RF decoupling the WLC-electronic circuit 212. The coupling ratio "k" may result in any voltage cancellation being less than complete. As such, when the WLC-electronic circuit 212 is in a receiving mode while NFC communications are carried out (e.g., where WLC is always "on" or "ready"), the WLC circuit would otherwise collect and derive power from the NFC communications absent the implementation of windings b and c with NFC communication, which operate to passively RF decouple the WLC-electronic circuit.

The following equations may be implemented with FIG. 2, in accordance with one or more embodiments.

$$V_{WLC} = V_{part(b)} + V_{part(c)} - V_{part(a)} - V_{part(d)} \qquad \text{Eq. 0}$$

In various contexts it may be considered that $V_{WLC}$=null (real→very low) when NFC is on. Furthermore, a vector-analysis may be implemented as follows:

$$\text{field}_{NFC}\uparrow = j\uparrow + i\uparrow + h\uparrow + k \cdot b\downarrow + k \cdot c\downarrow + g\uparrow + f\uparrow + e\uparrow \qquad \text{Eq. 1}$$

Under the theoretical assumption of k=1, the following simplified equation may apply:

$$\text{field}_{NFC}\uparrow = j\uparrow + i\uparrow + f\uparrow + e\uparrow \qquad \text{Eq. 2}$$

Figure 3:
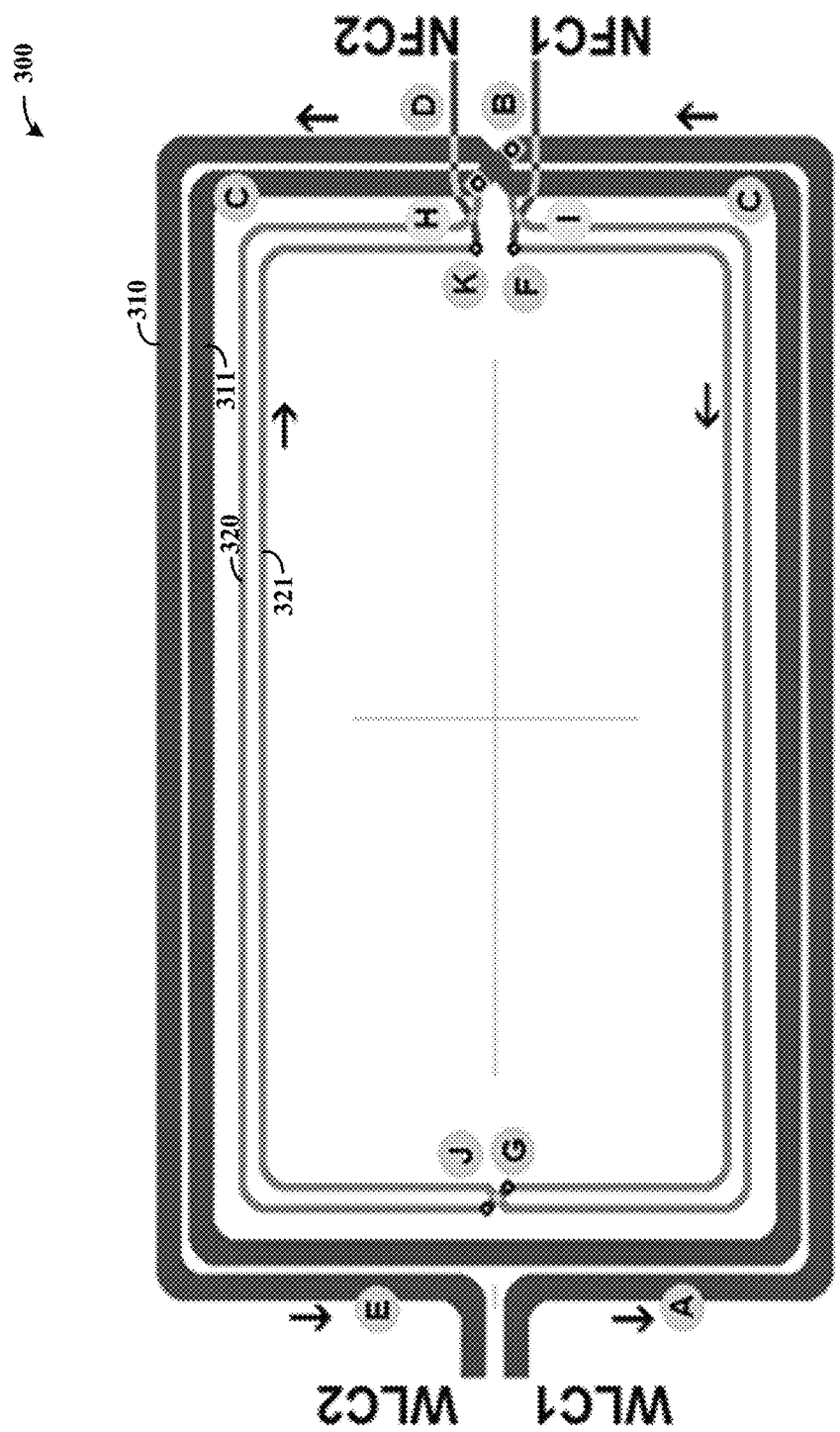
FIG. 3 shows another antenna circuit, in accordance with one or more embodiments.

FIG. 3 shows another antenna circuit 300, as may be implemented in accordance with one or more embodiments. The antenna circuit 300 includes two full WLC antenna coil turns 310 and 311, which operate to collect RF signals and provide a corresponding voltage at A and E for harvesting power. The antenna circuit 300 also includes two NFC antenna coil turns 320 and 321, for providing NFC communications (transmit and/or receive) via nodes B and D. The NFC antenna coil turns 320 and 321 are coupled at nodes H and I to the WLC antenna coil turn 311, which is also used during NFC communication.

In various implementations, the antenna circuit 300 is implemented for WLC applications as follows. Starting at WLC1 (and node A) the antenna extends around counter-clockwise on the outer WLC antenna coil 310, and moves to the inner WLC antenna coil 311 by crossing over at node B (e.g., using via contacts in a second layer). From B, the antenna extends around the inner WLC antenna coil 311 in a counter-clockwise direction and crosses back over to the outer WLC antenna coil 310 at node D, and continues on to node E and WLC2.

The antenna circuit 300 can be implemented for NFC communications as follows. Starting at NFC1 (and node F), the antenna extends clockwise around the inner NFC antenna coil 321 to node G where it crosses over to outer NFC antenna coil 320 (e.g., by way of vias and connector in another layer) and continues to node H coupled to the inner WLC antenna coil 311 and continues in a counter-clockwise direction around the inner WLC antenna coil where it is coupled back to the outer NFC antenna coil 320 at I. From I, the antenna continues in a clockwise direction around outer NFC antenna coil 320, crosses over to the inner NFC antenna coil 321 at J, and continues to K (and NFC2).

Figure 4B:
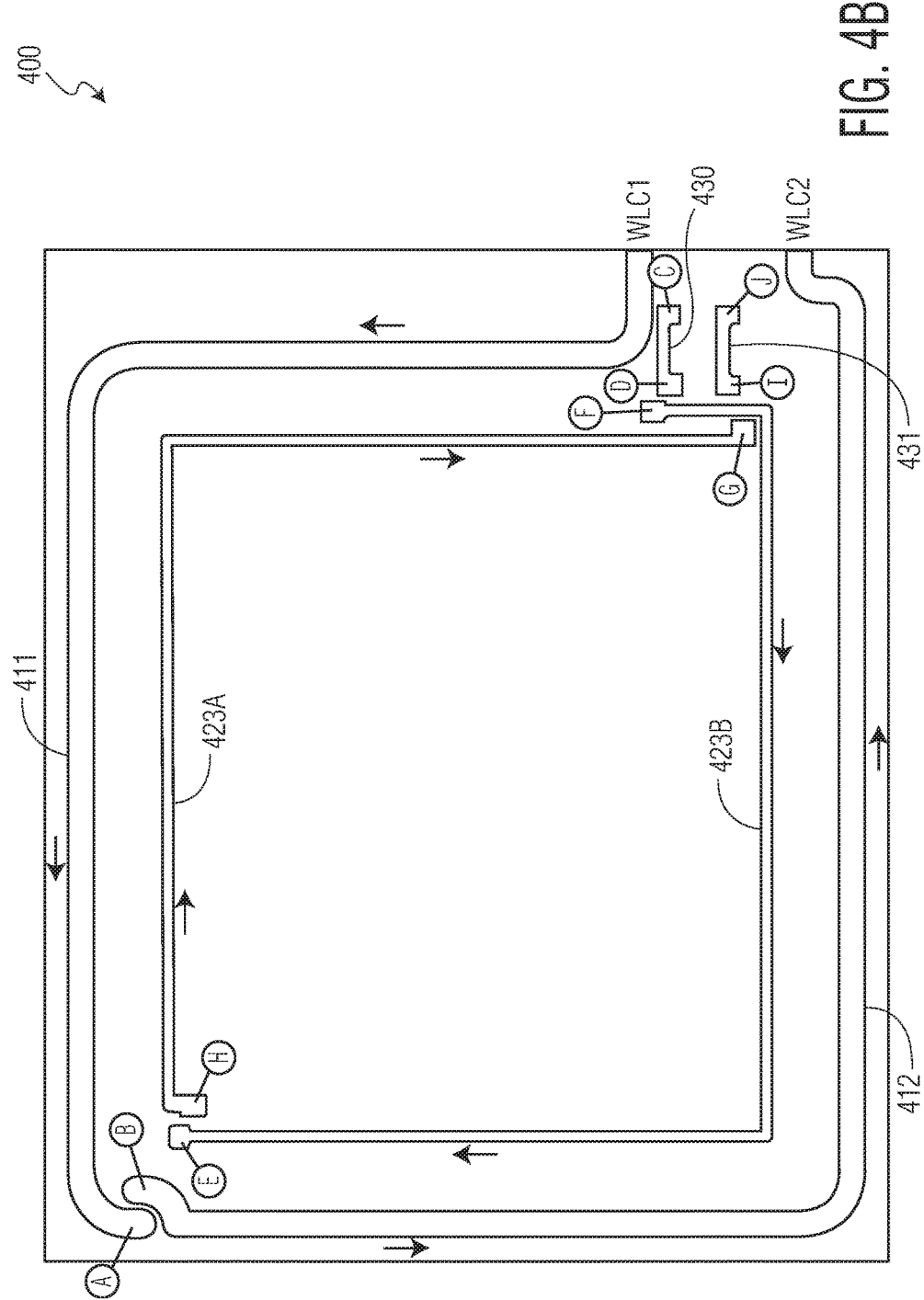

FIGS. 4A and 4B show top and bottom layers of an antenna circuit 400, in accordance with one or more embodiments. The bottom layer in FIG. 4B has been mirrored to allow the reader to follow the current flow direction, and can be implemented with various arrangements in this regard. The top layer of antenna circuit 400 in FIG. 4A has a WLC antenna loop 410 connected respectively at nodes A and B to two half loops 411 and 412 as shown in FIG. 4B, and therein to WLC1 and WLC2 (e.g., to a wireless power harvesting circuit). Three full NFC antenna coil turns are shown. FIG. 4A shows outer NFC half loops 420A and 420B coupled to the WLC antenna loop 410, and inner NFC half loops 421A and 421B. FIG. 4B shows an additional NFC turn including half loops 423A and 423B.

For WLC, beginning at WLC1 in FIG. 4B the antenna extends counter-clockwise along half loop 411 to node A, where it is coupled to overlying antenna loop 410 in FIG. 4A and makes a full loop before dropping back down to half loop 412 at node B and to NFC2.

For NFC, beginning at NFC 1 in FIG. 4A, the antenna is coupled to an underlying connector 431 at J as shown in FIG. 4B in order to bypass WLC loop 410, and extends back up to the upper layer at node I where it is coupled to inner NFC half loop 421A. The antenna makes a half loop and returns to the underlying layer at node H, where it continues on half loop 423A to node G where it returns to the top layer. The antenna then extends through half loop 420B and around the full WLC loop 410 where it continues counter-clockwise to node B and switches over to NFC half loop 420A, and continues to node F. From node F in FIG. 4B, the antenna continues along half loop 423B to node E, and then along half loop 421B (in FIG. 4A) to node D. Node D is connected to underlying connector 430 in FIG. 4B to bypass loop 410 and returns to the top layer at node C at NFC2.

The skilled artisan would recognize that various terminology as used in the Specification (including claims) connote a plain meaning in the art unless otherwise indicated. As examples, the Specification describes and/or illustrates aspects useful for implementing the claimed invention by way of various blocks, modules, loops, NFC or WLC circuitry and/or other circuits which exemplify how certain embodiments may be carried out in the form or structures, steps, functions, operations, activities, etc. In these contexts, a "block" (also sometimes "logic circuitry" or "module") is a circuit that carries out one or more of these or related operations/activities (e.g., reference numerals 130 and 140 may depict a block/module as described herein). For example, in certain of the above-discussed embodiments, one or more modules are discrete logic circuits or programmable logic circuits configured and arranged for implementing these operations/activities, as may be carried out in the approaches shown in FIGS. 2-4B. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described with various NFC communications or WLC power harvesting is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first antenna", a "second antenna", or other circuitry and/or related components, where the antenna might be replaced with terms such as "circuit," "circuitry" and others, the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. A variety of different antenna structures may be used, with fewer or more windings, with an effective RF decoupling carried out in manners consistent with those characterized herein. Different portions of respective antennas can be shared, such as by utilizing shared windings of an NFC antenna (e.g., by a wireless power circuit, rather than an NFC circuit using part of a wireless power antenna). Shared antenna portions may be utilized from windings in different positions, such as connected to terminals of a wireless power circuit. Furthermore, different types of communications can be used (e.g., instead of or in addition to NFC communications), and different types of antennas may be combined such as those used for different types of communication (e.g., without necessarily harvesting power), with RF decoupling. Such modifications do not depart from the true spirit and scope of various aspects of the invention, including aspects set forth in the claims.

What is claimed is:

1. An apparatus comprising:
    a receiver circuit configured and arranged to output power using energy from a radio frequency (RF) signal received across respective terminals at a first frequency;
    a near-field communication (NFC) circuit configured and arranged to communicate via NFC signals via respective terminals at a second frequency that is different than the first frequency;
    a first antenna having windings connected in series with the terminals of the receiver circuit, the first antenna being configured and arranged to collect the RF signal at the first frequency and present the RF signal to the receiver circuit; and
    a second antenna having:
        a first set of windings connected to a first one of the terminals of the NFC circuit and to one of the windings of the first antenna,
        a second set of windings connected to a second one of the terminals of the NFC circuit and to another one of the windings of the first antenna, and
        the first and second sets of windings and the windings of the first antenna to which the first and second sets of windings being connected in series between the terminals of the NFC circuit and configured and arranged to communicate the NFC signals with the NFC circuit at the second frequency,
    wherein the receiver circuit is configured and arranged to output the power by rectifying and regulating power from the RF signal received across the terminals.

2. The apparatus of claim 1, wherein the first and second sets of windings and the windings of the first antenna to which the first and second sets of windings are connected are configured and arranged to RF decouple the receiver circuit from the second antenna.

3. The apparatus of claim 2, the first and second sets of windings and the windings of the first antenna to which the first and second sets of windings are connected being configured and arranged to RF decouple the receiver circuit by preventing the NFC signals from reaching the receiver circuit.

4. The apparatus of claim 2, wherein the first and second sets of windings and the windings of the first antenna to which the first and second sets of windings are connected are configured and arranged to RF decouple the receiver circuit from the second antenna by generating a signal in the windings of the first antenna to which the first and second sets of windings are connected, which cancels a signal generated in other windings of the first antenna.

5. The apparatus of claim 2, wherein the second antenna is configured and arranged to RF decouple the receiver circuit from the NFC signals by providing a voltage drop across the windings of the first antenna to which the first and second sets of windings are connected that is opposite in polarity to a voltage drop generated across other windings of the first antenna by the NFC signals.

6. The apparatus of claim 1, wherein
    the receiver circuit includes a first matching circuit configured and arranged to match an impedance of the first antenna between the respective terminals of the receiver circuit at the first frequency; and
    the NFC circuit includes a second matching circuit configured and arranged to match to an impedance of the second antenna between the respective terminals of the NFC circuit at the second frequency.

7. The apparatus of claim 6, wherein the first and second sets of windings and the windings of the first antenna to which the first and second sets of windings are connected are configured and arranged to RF decouple the first matching circuit from the second matching circuit in response to the second antenna receiving the NFC signals at the second frequency.

8. The apparatus of claim 6, wherein the impedance of the second antenna includes impedance provided by the first set of windings, the second set of windings, and the windings of the first antenna to which the first and second sets of windings are connected.

9. The apparatus of claim 6, wherein the impedance of the first antenna is different than the impedance of the second antenna.

10. The apparatus of claim 1, wherein the first and second sets of windings and the windings of the first antenna to which the first and second sets of windings are connected are configured and arranged to RF decouple the receiver circuit from the NFC signals at the second frequency by flowing current in the windings of the first antenna to which the first and second sets of windings are connected that mitigates current flow to the receiver circuit.

11. The apparatus of claim 1, wherein
    the first antenna is configured and arranged to couple energy from the RF signal to the receiver circuit by flowing current through the windings of the first antenna in a first direction, and
    the second antenna is configured and arranged to collect and couple the NFC signals to the NFC circuit by flowing current through the windings of the first antenna to which the first and second sets of windings are connected in a second direction that is opposite the first direction.

12. The apparatus of claim 1, wherein the receiver circuit is a wireless power circuit configured and arranged to utilize the first antenna as a transformer winding to receive wireless power from a remote wireless power source that transmits the RF signal to the first antenna.

13. An apparatus comprising:
    a receiver circuit configured and arranged to output power using energy from a radio frequency (RF) signal received across respective terminals at a first frequency;

a near-field communication (NFC) circuit configured and arranged to communicate via NFC signals via respective terminals at a second frequency that is different than the first frequency;

a first antenna having windings connected in series with the terminals of the receiver circuit, the first antenna being configured and arranged to collect the RF signal at the first frequency and present the RF signal to the receiver circuit; and a second antenna having:
- a first set of windings connected to a first one of the terminals of the NFC circuit and to one of the windings of the first antenna,
- a second set of windings connected to a second one of the terminals of the NFC circuit and to another one of the windings of the first antenna, and
- the first and second sets of windings and the windings of the first antenna to which the first and second sets of windings being connected in series between the terminals of the NFC circuit and configured and arranged to communicate the NFC signals with the NFC circuit at the second frequency, wherein the first antenna is configured and arranged to couple energy from the RF signal to the receiver circuit by flowing current through the windings of the first antenna in a first direction, wherein the second antenna is configured and arranged to collect and couple the NFC signals to the NFC circuit by flowing current through the windings of the first antenna to which the first and second sets of windings are connected in a second direction that is opposite the first direction.

14. The apparatus of claim 13, wherein the first and second sets of windings and the windings of the first antenna to which the first and second sets of windings are connected are configured and arranged to RF decouple the receiver circuit from the second antenna.

15. The apparatus of claim 14, the first and second sets of windings and the windings of the first antenna to which the first and second sets of windings are connected being configured and arranged to RF decouple the receiver circuit by preventing the NFC signals from reaching the receiver circuit.

16. The apparatus of claim 14, wherein the first and second sets of windings and the windings of the first antenna to which the first and second sets of windings are connected are configured and arranged to RF decouple the receiver circuit from the second antenna by generating a signal in the windings of the first antenna to which the first and second sets of windings are connected, which cancels a signal generated in other windings of the first antenna.

17. An apparatus comprising:
a receiver circuit configured and arranged to output power using energy from a radio frequency (RF) signal received across respective terminals at a first frequency;

a near-field communication (NFC) circuit configured and arranged to communicate via NFC signals via respective terminals at a second frequency that is different than the first frequency;

a first antenna having windings connected in series with the terminals of the receiver circuit, the first antenna being configured and arranged to collect the RF signal at the first frequency and present the RF signal to the receiver circuit; and a second antenna having:
- a first set of windings connected to a first one of the terminals of the NFC circuit and to one of the windings of the first antenna,
- a second set of windings connected to a second one of the terminals of the NFC circuit and to another one of the windings of the first antenna, and
- the first and second sets of windings and the windings of the first antenna to which the first and second sets of windings being connected in series between the terminals of the NFC circuit and configured and arranged to communicate the NFC signals with the NFC circuit at the second frequency, wherein the receiver circuit is a wireless power circuit configured and arranged to utilize the first antenna as a transformer winding to receive wireless power from a remote wireless power source that transmits the RF signal to the first antenna.

18. The apparatus of claim 17, wherein the first and second sets of windings and the windings of the first antenna to which the first and second sets of windings are connected are configured and arranged to RF decouple the receiver circuit from the second antenna.

19. The apparatus of claim 18, the first and second sets of windings and the windings of the first antenna to which the first and second sets of windings are connected being configured and arranged to RF decouple the receiver circuit by preventing the NFC signals from reaching the receiver circuit.

20. The apparatus of claim 18, wherein the first and second sets of windings and the windings of the first antenna to which the first and second sets of windings are connected are configured and arranged to RF decouple the receiver circuit from the second antenna by generating a signal in the windings of the first antenna to which the first and second sets of windings are connected, which cancels a signal generated in other windings of the first antenna.

* * * * *